US012734815B2

(12) United States Patent
Noda et al.

(10) Patent No.: US 12,734,815 B2
(45) Date of Patent: Sep. 15, 2026

(54) CARTRIDGE AND PRINTING APPARATUS

(71) Applicant: CANON KABUSHIKI KAISHA, Tokyo (JP)

(72) Inventors: Masato Noda, Kanagawa (JP); Hiroki Hayashi, Kanagawa (JP); Yuusuke Tanaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 18/185,986

(22) Filed: Mar. 17, 2023

(65) Prior Publication Data

US 2023/0302806 A1 Sep. 28, 2023

(30) Foreign Application Priority Data

Mar. 28, 2022 (JP) ................................ 2022-051686

(51) Int. Cl.
*B41J 2/175* (2006.01)

(52) U.S. Cl.
CPC .................................. *B41J 2/1752* (2013.01)

(58) Field of Classification Search
None
See application file for complete search history.

(56) References Cited

U.S. PATENT DOCUMENTS 6,505,926 B1 1/2003 Trafton
6,628,908 B2 * 9/2003 Matsumoto ........ G03G 15/0877 222/DIG. 1
6,851,799 B2 2/2005 Trafton
8,020,733 B2 * 9/2011 Snodgrass ................ A47K 5/13 222/325
10,357,976 B2 * 7/2019 Ono ..................... B41J 2/17553
2003/0043243 A1 3/2003 Trafton
2008/0088064 A1 4/2008 Jones

FOREIGN PATENT DOCUMENTS

| | | | |
|---|---|---|---|
| JP | H08-001959 | A | 1/1996 |
| JP | 2001-347681 | | 12/2001 |
| JP | 2003-072103 | A | 3/2003 |
| JP | 2015-193157 | A | 11/2015 |
| JP | 2018-161881 | A | 10/2018 |
| JP | 2019-018858 | A | 2/2019 |

OTHER PUBLICATIONS

Jan. 27, 2026 Japanese Official Action in Japanese Patent Appln. No. 2022-051686.

* cited by examiner

*Primary Examiner* — Alejandro Valencia
(74) *Attorney, Agent, or Firm* — Venable LLP

(57) ABSTRACT

A cartridge is mountable to a first mount portion of a printing apparatus in a predetermined orientation, and includes a supply port configured to supply a liquid inside the cartridge to the printing apparatus and a cover configured to cover an outer periphery of the supply port and having a concave portion at a position along the outer periphery. The concave portion is fitted to a first convex portion of the first mount portion in a case when the cartridge is mounted to the first mount portion in the predetermined orientation, and is fittable to a second convex portion of a second mount portion provided at a position different from the first convex portion in a case when the cover is turned by a predetermined angle from the predetermined orientation about the supply port. The cartridge is not mounted to the second mount portion in the predetermined orientation.

11 Claims, 20 Drawing Sheets

CARTRIDGE AND PRINTING APPARATUS

BACKGROUND

Cross-Reference to Priority Application

This application claims the benefit of Japanese Patent Application No. 2022-051686, filed Mar. 28, 2022 which is hereby incorporated by reference herein in its entirety.

Field of the Invention

The present disclosure relates to a cartridge and a printing apparatus.

Japanese Patent Laid-Open No. 2001-347681 discloses a configuration for inhibiting mismounting of an ink cartridge (referred to also as "cartridge") in which concave portions are formed in an ink supply port of the cartridge and convex portions are formed on a mounting region of a carriage to which to mount the cartridge.

With the configuration of Japanese Patent Laid-Open No. 2001-347681, however, the pattern of engagement between the convex portions and the concave portions is different for each product or ink color. For this reason, inhibiting mismounting of a cartridge requires a large number of parts. Moreover, the number of manufacturing steps increases as well, thereby making the manufacturing costly.

In view of the above, an object of the technology according to the present disclosure is to provide a technology capable of inhibiting mismounting of a cartridge with a simple configuration.

SUMMARY

A cartridge capable according to the present disclosure to achieve the above object is a cartridge capable of being mounted to a first mount portion of a printing apparatus in a predetermined orientation, the cartridge including a supply port configured to supply a liquid inside the cartridge to the printing apparatus and a cover configured to cover an outer periphery of the supply port and having a concave portion at a position along the outer periphery, in which the concave portion is configured to be fitted to a first convex portion of the first mount portion in a case when the cartridge is mounted to the first mount portion in the predetermined orientation, and capable of being fitted to a second convex portion of a second mount portion other than the first mount portion in a case when the cover is turned by a predetermined angle from the predetermined orientation about the supply port as a center of a turn axis, the second convex portion being provided at a position different from a position at which the first convex portion of the first mount portion is provided, and the cartridge is not mounted to the second mount portion in the predetermined orientation.

Further features of the present invention will become apparent from the following description of exemplary embodiments with reference to the attached drawings.

DESCRIPTION OF THE EMBODIMENTS

First, to facilitate the understanding of cartridges and printing apparatuses according to the following embodiments, a common cartridge and printing apparatus will be described using FIGS. 18 to 20. A common printing apparatus of a type that forms an image on a print medium by scanning a print head over the print medium and conveying the print medium at intervals of a predetermined amount in a direction perpendicular to the scanning direction (so-called serial printing type) has been known. The print head is mounted on a carriage for the scanning. The print head in the state of being mounted on this carriage is supplied with an ink from a cartridge. The cartridge is capable of continuously supplying the ink as much as the print head ejects the ink.

Figure 18:
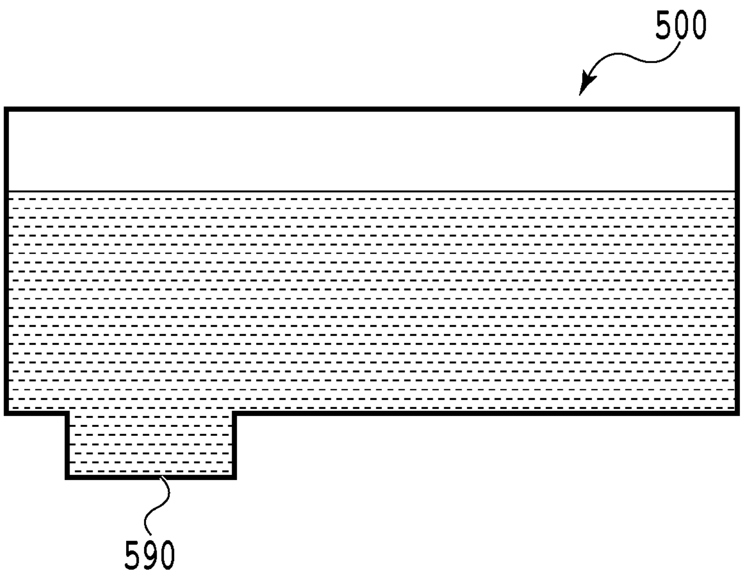
FIG. 18 is a schematic view of a common cartridge.

FIG. 18 is a schematic view of a common cartridge 500. As illustrated in FIG. 18, the cartridge 500 stores an ink therein. The cartridge 500 has a supply port 590 through which to supply the ink to a printing apparatus.

Figure 19:
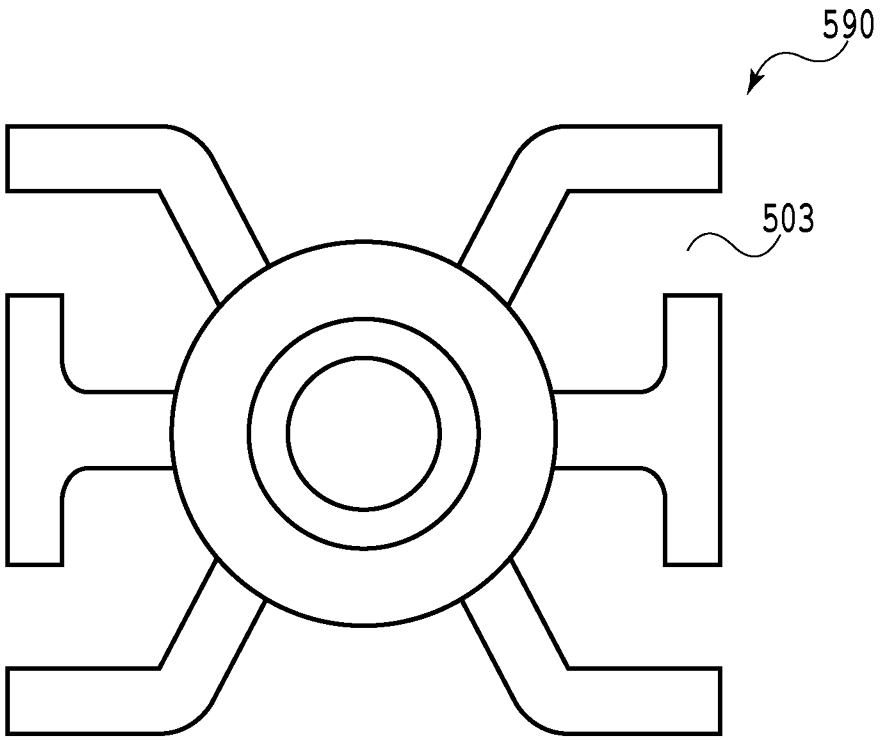
FIG. 19 is a schematic view of a common supply port.

FIG. 19 is a schematic view of the supply port 590, which is a common supply port. As illustrated in FIG. 19, cartridge concave portions 503 are formed around the supply port 590 as counterparts of carriage convex portions 504 (see FIG. 20) formed on the carriage of a common printing apparatus.

Figure 20:
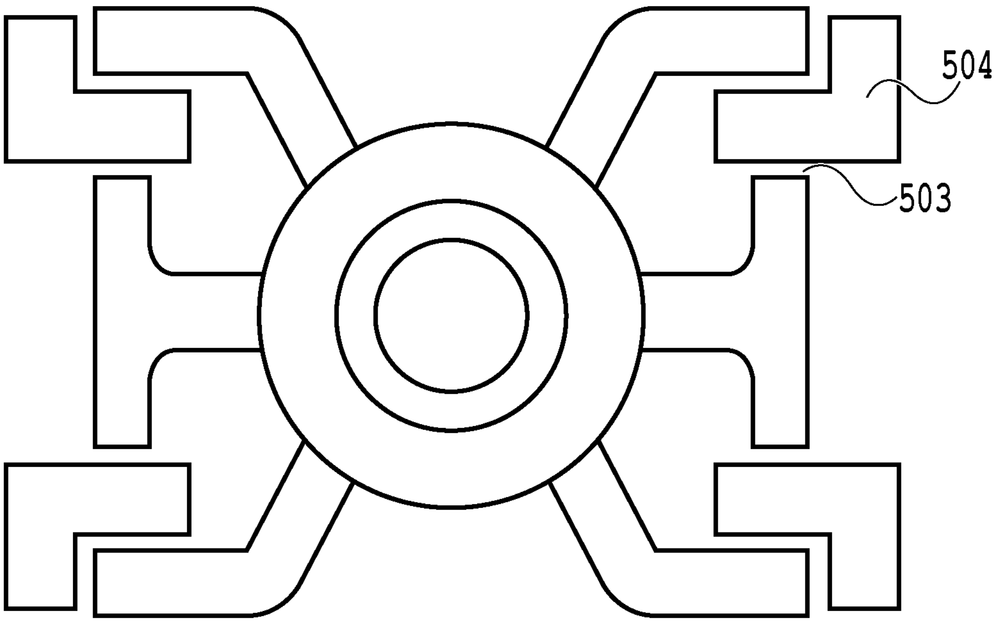
FIG. 20 is a schematic view illustrating the supply port and its surroundings after mounting to a common carriage.

FIG. 20 is a schematic view illustrating the supply port 590 and its surroundings after mounting to a common carriage. As illustrated in FIG. 20, the carriage usually has the carriage convex portions 504. In a case when the carriage convex portions 504 and the cartridge concave portions 503 correspond to each other, the cartridge 500 can be mounted to the carriage.

The above is a description of a common cartridge and printing apparatus.

First Embodiment

General Description of Liquid Supply System

Figure 1:
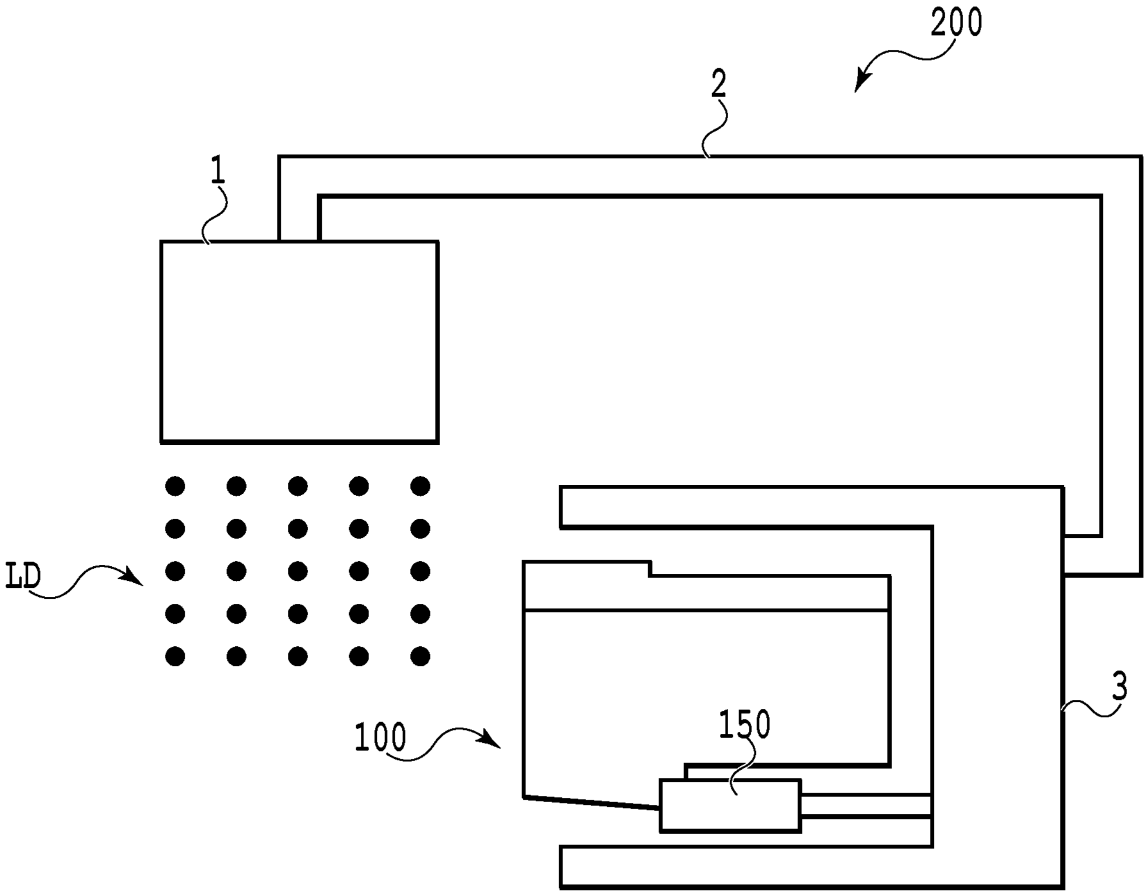
FIG. 1 is a schematic diagram of a liquid supply system according to a first embodiment.

FIG. 1 is a schematic diagram of a liquid supply system according to a first embodiment. As illustrated in FIG. 1, the liquid supply system includes a cartridge 100, which is capable of being mounted to a first mount portion (described later) of a printing apparatus 200 in a predetermined orientation and the printing apparatus 200, which is supplied with a liquid from the mounted cartridge 100. Note that the cartridge 100 according to the present embodiment is of an off-carriage type for serial printing. The printing apparatus 200 has a holder 3 having a mount portion 150 to which to mount the cartridge 100, a tube 2 connected at one end to the holder 3 and at the other end to a carriage (not illustrated) carrying a print head 1; and the print head 1, which ejects the liquid. The cartridge 100 is detachably attachable to the mount portion 150 of the holder 3. The mount portion 150 has a hollow needle 310 (see FIG. 5). The needle 310 is connected to the tube 2. The needle 310 forms a terminal of the printing apparatus 200 in the liquid supply system. The cartridge 100 mounted to the mount portion 150 communicates with the print head 1 carried by the carriage through the needle 310 of the mount portion 150, inside a housing of the holder 3, which has the mount portion 150, and the tube 2 connecting the holder 3 and the carriage. The print head 1 performs printing (e.g., printing letters) by ejecting the liquid supplied from the cartridge 100 in the form of droplets LD. As the liquid is consumed by being ejected from the print head 1, the same amount of the liquid as the liquid consumed is supplied again to the print head 1 from the cartridge 100.

General Description of Cartridge 100

Figure 2:
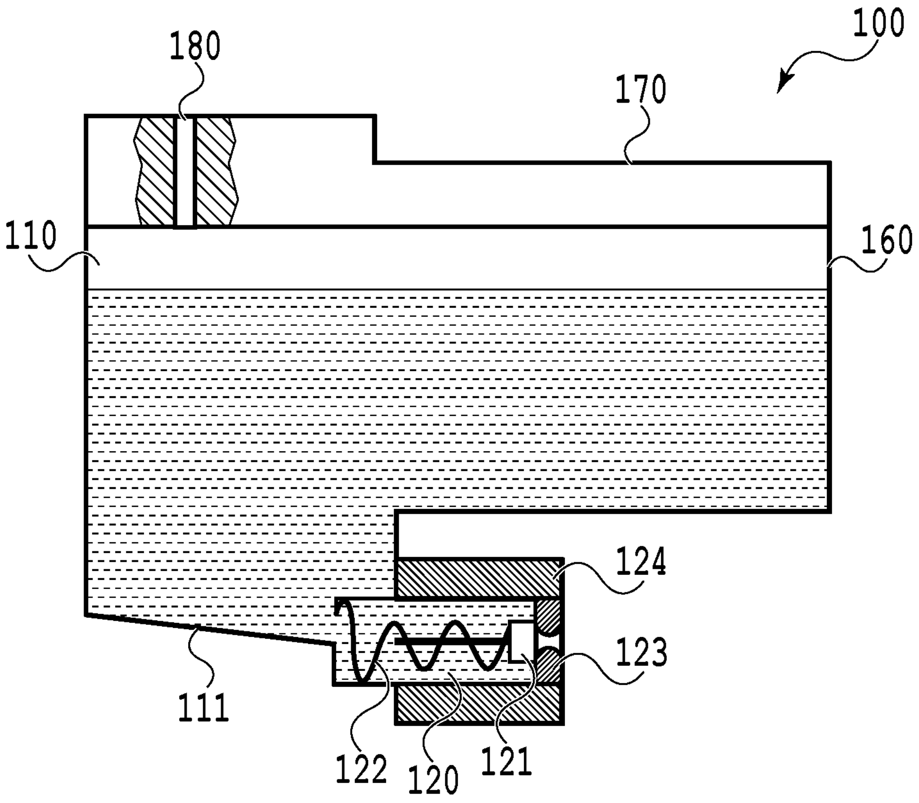
FIG. 2 is a schematic cross-sectional view of a cartridge according to the first embodiment.

FIG. 2 is a schematic cross-sectional view of the cartridge 100 according to the present embodiment. The cartridge 100 mainly has a storage portion 110, a supply port 120, and a cover 124 in which an opening 1240 (see FIG. 3) for mounting the cover 124 to the supply port 120 is formed. The cover 124 covers the outer periphery of the supply port 120. The storage portion 110 has a housing 160 and a lid 170. The supply port 120 is disposed on the housing 160 side. The lid 170 has an atmosphere communication port 180. The liquid to be supplied to the print head 1 is stored in the storage portion 110. The liquid stored in the storage portion 110 will be supplied to the print head 1 through the supply port 120. As the liquid inside the storage portion 110 decreases, the atmospheric air is introduced into the storage portion 110 through the atmosphere communication port 180. The cover 124 has a concave portion 126 (see FIG. 3) at a position along the outer periphery of the supply port 120 as a mismounting inhibition mechanism that inhibits mismounting to the mount portion 150 of the printing apparatus 200. Specifically, the cover 124 has the concave portion 126 extending along the direction in which the cover 124 is inserted into the mount portion 150 at a position corresponding to the position of a convex portion 125 (see FIG. 5) of the mount portion 150.

In this way, by turning the cover 124 in the manufacturing of the cartridge 100, a plurality of mounting patterns corresponding to different positions of the convex portion 125 of the mount portion 150 are created with a single forming pattern of the concave portion 126. In sum, the cover 124 functions as a mismounting inhibition mechanism that inhibits mismounting of the cartridge 100 in the case of mounting it to the printing apparatus 200. Note that mounting patterns of the cover 124 will be described later. Next, components of the cartridge 100 will be described in detail.

<Storage Portion 110>

As described above, the storage portion 110 stores the liquid to be supplied to the print head 1. The supply port 120 is disposed at the lowermost portion of the storage portion 110. At a bottom portion of the storage portion 110, the storage portion 110 has an inclined surface 111 extending downward in the direction of gravity toward the supply port 120, and a single step extending downward from the inclined surface 111. The inclined surface 111 is inclined downward toward to the supply port 120. This improves the ease of using up the liquid.

<Supply Port 120>

Next, the supply port 120 will be described. The supply port 120 is connectable to the printing apparatus 200. The supply port 120 supplies the liquid inside the storage portion 110 to the printing apparatus 200. That is, the supply port 120 supplies the liquid inside the cartridge 100 to the printing apparatus 200. The supply port 120 is provided with a valve unit. The supply port 120 has a valve spring 122, a valve body 121, and an annular sealing member 123 therein. The constituent material of the valve spring 122 includes a metal. The constituent material of the valve body 121 includes a resin. The constituent material of the sealing member 123 includes rubber. The sealing member 123 is mounted to an opening of the supply port 120. Thus, before the cartridge 100 is mounted to the printing apparatus 200, the valve body 121 is pressed against the sealing member 123 by a biasing force from the valve spring 122. This keeps the supply port 120 closed.

<Method for Manufacturing Cartridge 100>

Figure 3:
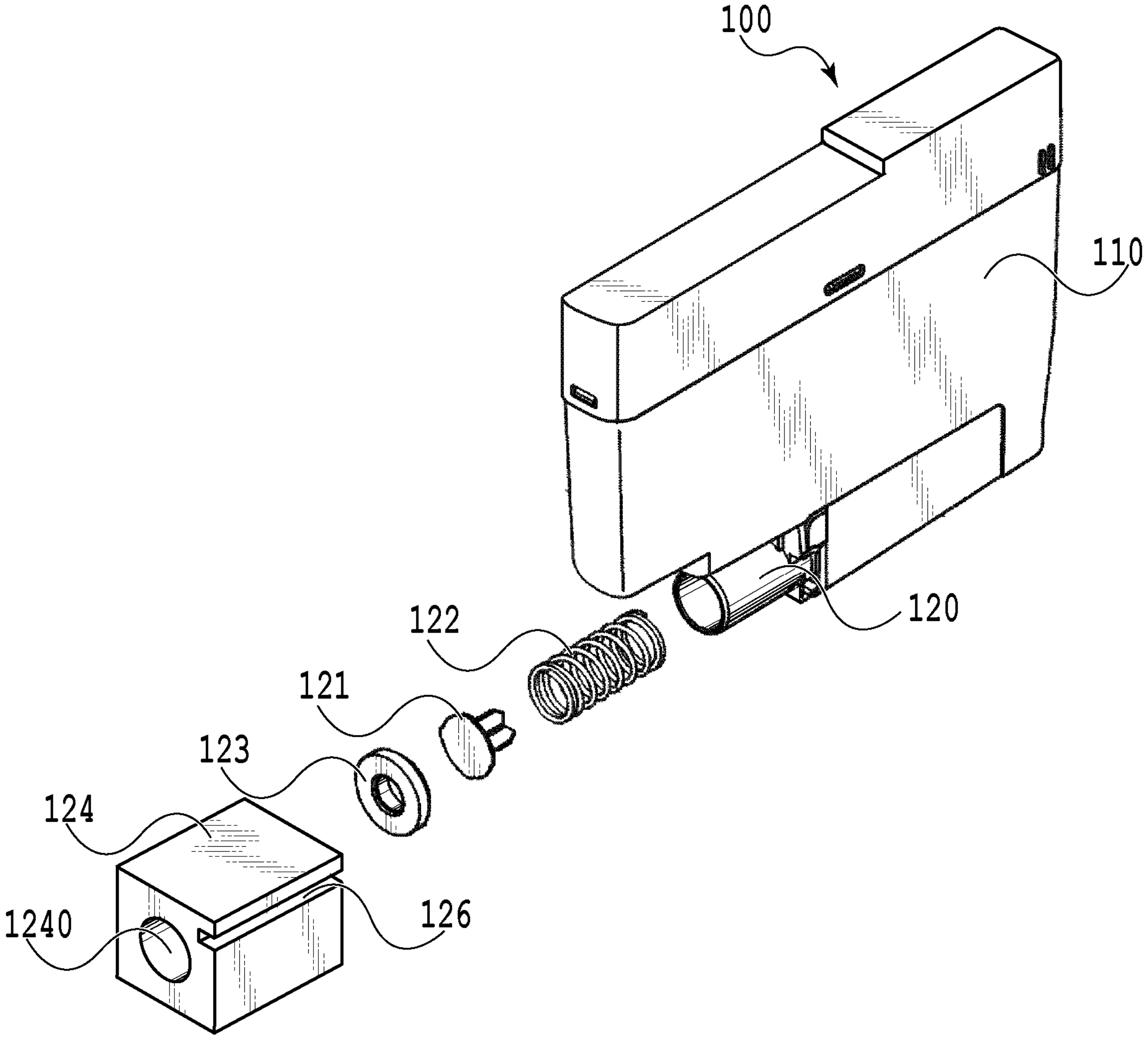
FIG. 3 is a schematic view illustrating an example of a process of manufacturing the cartridge.

FIG. 3 is a schematic view illustrating an example of a process of manufacturing the cartridge 100. In the following, parts to be mounted to the supply port 120 will be mainly discussed for a simple description. A series of steps for manufacturing the cartridge 100 will be described below using FIG. 3. In the following, "step S_" will be abbreviated simply as "S_".

In S1, the housing 160 is prepared. In S2, the valve spring 122 is installed in the supply port 120 of the housing 160. In S3, the valve body 121 is installed so as to contact the leading end of the valve spring 122. In S4, the sealing member 123 is installed such that its inner periphery is closed by the valve body 121. In S5, in a case of mounting the cover 124 to a first cartridge, the cover 124 is mounted to the first cartridge at an angle different from the angle at which to mount the cover 124 to a second cartridge storing a different type of liquid from the liquid in the first cartridge. Specifically, in this step, the angle at which to mount the cover 124 to the supply port 120 is adjusted, and then the cover 124 is mounted to the supply port 120. For example, the cover 124 is turned about the supply port 120 as the center of the turn axis. The angle by which to turn the cover 124 at this time can be adjusted to any angle. Thus, the angle at which to mount the cover 124 can be set to any angle. In S6, the cover 124 is fixed to the supply port 120. Examples of the method for fixing the cover 124 include fixing by thermal welding or with an adhesive, and the like.

The above is a general description of a process of manufacturing the cartridge 100. This process makes it possible to create a plurality of mounting patterns by adjusting the mounting angle of the cover 124 to any angle although there is only one forming pattern for the concave portion 126 of the cover 124. Note that the order of the steps described above may be changed as long as the mounting angle of the cover 124 can be adjusted. For example, the cover 124 may be mounted to the supply port 120 and then the cover 124 may be turned to adjust its fixing angle.

<Mounting Patterns of Cover 124>

A configuration of the cartridge 100 in the present disclosure will be described below using FIGS. 4A to 4D.

Figures 4A, 4B, 4C, 4D:
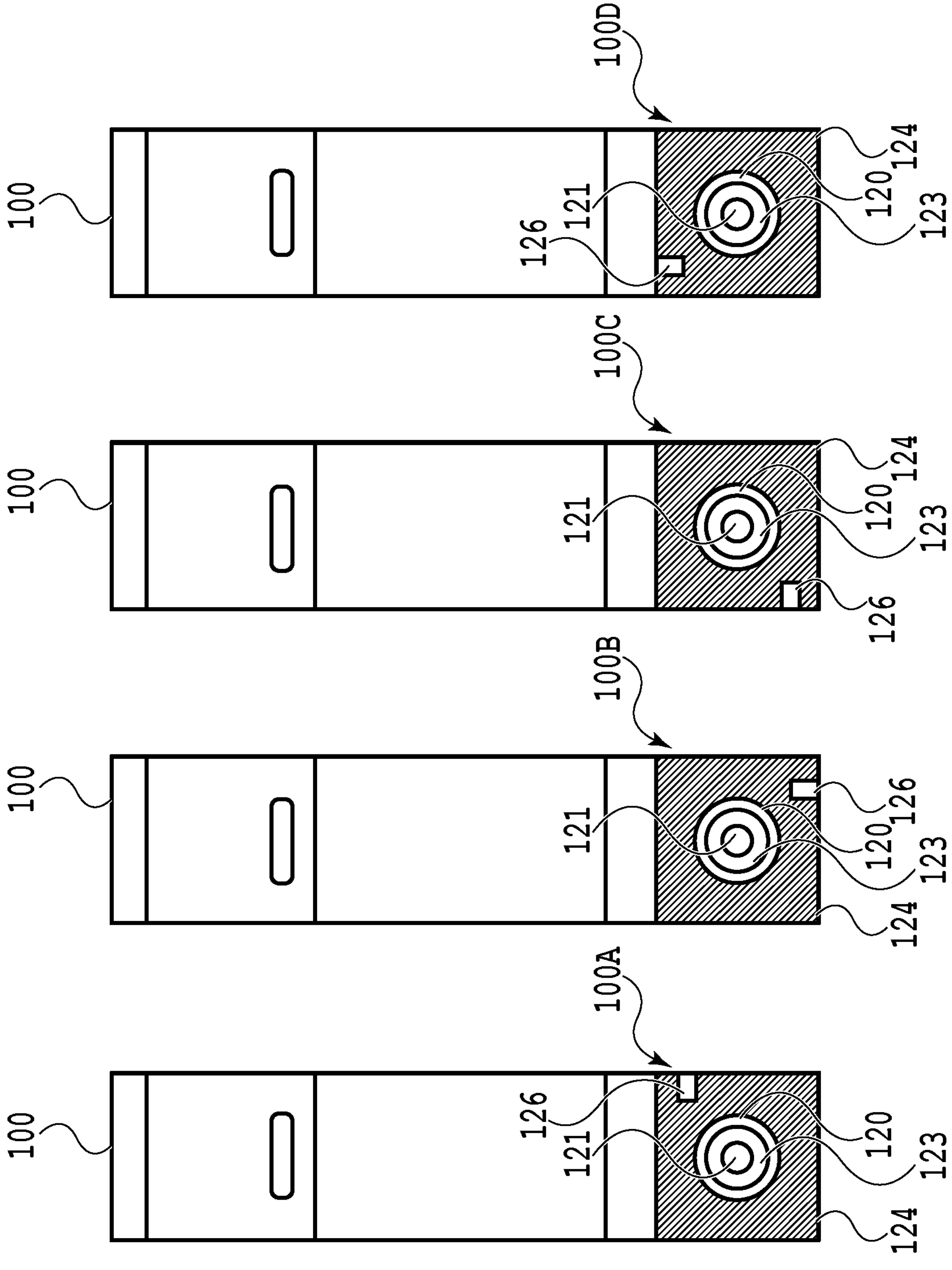
FIGS. 4A to 4D are views illustrating examples of the mounting pattern of a cover in the first embodiment.

FIG. 4A is a view illustrating a first mounting pattern 100A of the cover 124. The cover 124 has a shape corresponding to the shape of the mount portion 150 of the printing apparatus 200, in which the cover 124 is to be inserted. In the illustrated example, the cover 124 illustrated in FIG. 4A has a shape corresponding to the shape of the mount portion 150 illustrated in FIG. 5A to be mentioned later. Also, the cover 124 illustrated in FIG. 4A is fixed with the mounting angle on the supply port 120 adjusted by being turned about the supply port 120 as the center of the turn axis.

FIG. 4B is a view illustrating a second mounting pattern 100B of the cover 124. FIG. 4C is a view illustrating a third mounting pattern 100C of the cover 124. FIG. 4D is a view illustrating a fourth mounting pattern 100D of the cover 124. As illustrated in FIGS. 4A to 4D, the shape of a cross section of the cover 124 cut in a direction crossing the direction in which the cover 124 is inserted into the mount portion 150 includes a substantially regular polygon. The shape of the cross section of the cover 124 in the present embodiment includes a substantially regular quadrilateral. The cartridges 100 illustrated respectively in FIGS. 4A to 4D store different types of liquids (e.g., liquids of different colors). For example, the cartridge 100 with the first mounting pattern 100A has a cyan ink therein. The cartridge 100 with the second mounting pattern 100B has a magenta ink therein. The cartridge 100 with the third mounting pattern 100C has a yellow ink therein. The cartridge 100 with the fourth mounting pattern 100D has a black ink therein.

In S5 described above, with the first mounting pattern 100A, the cover 124 is mounted with the concave portion 126 positioned on an upper right side as viewed from the front of the cartridge 100. In this way, the cartridge 100 storing the cyan ink can have a mismounting inhibition mechanism with a first pattern (described later). For the second mounting pattern 100B, the cover 124 is turned clockwise by ninety degrees from the first mounting pattern 100A and mounted to the supply port 120. Specifically, for the second mounting pattern 100B, the concave portion 126 is positioned on a lower right side of the cover 124 as viewed from the front of the cartridge 100. In this way, the cartridge 100 storing the magenta ink can have a mismounting inhibition mechanism with a second pattern while using a cover 124 having the same shape as the cover 124 used for the first mounting pattern 100A. For the third mounting pattern 100C, the cover 124 is turned clockwise by one hundred eighty degrees from the first mounting pattern 100A and mounted to the supply port 120. Specifically, for the third mounting pattern 100C, the concave portion 126 is positioned on a lower left side of the cover 124 as viewed from the front of the cartridge 100. In this way, the cartridge 100 storing the yellow ink can have a mismounting inhibition mechanism with a third pattern while using a cover 124 having the same shape as the cover 124 used for the first mounting pattern 100A. For the fourth mounting pattern 100D, the cover 124 is turned clockwise by two hundred seventy degrees from the first mounting pattern 100A and mounted to the supply port 120. Specifically, for the fourth mounting pattern 100D, the concave portion 126 is positioned on an upper left side of the cover 124 as viewed from the front of the cartridge 100. In this way, the cartridge 100 storing the black ink can have a mismounting inhibition mechanism with a fourth pattern while using a cover 124 having the same shape as the cover 124 used for the first mounting pattern 100A. The direction of turning the cover 124 may be counterclockwise.

For example, the cover 124 has a concave portion 126 to be fitted to a first convex portion (see FIG. 6A) formed on the first mount portion of the printing apparatus 200, to which the cartridge 100 is to be mounted. Also, the shape of the cover 124 includes such a shape that its cross section is symmetric in a case when the cover 124 is turned by a predetermined angle (e.g., ninety degrees) about the supply port 120 as the center of the turn axis (e.g., a regular quadrilateral). Moreover, in a case when the cover 124 is turned from its predetermined position to a predetermined angle, the concave portion 126 also moves to a position turned by a predetermined angle (see FIG. 4B). Furthermore, the cover 124 can be mounted to a second mount portion (see FIG. 6B) with a second convex portion formed at a position different from the first mount portion.

In the present embodiment, the angle at which to mount the cover 124 to the supply port 120 is adjusted according to the type of the liquid stored in the cartridge 100, and then the cover 124 is mounted. In this way, a plurality of patterns (e.g., four patterns) of mismounting inhibition mechanisms can be created using covers 124 with the same shape.

<Printing Apparatus 200>

Figure 5:
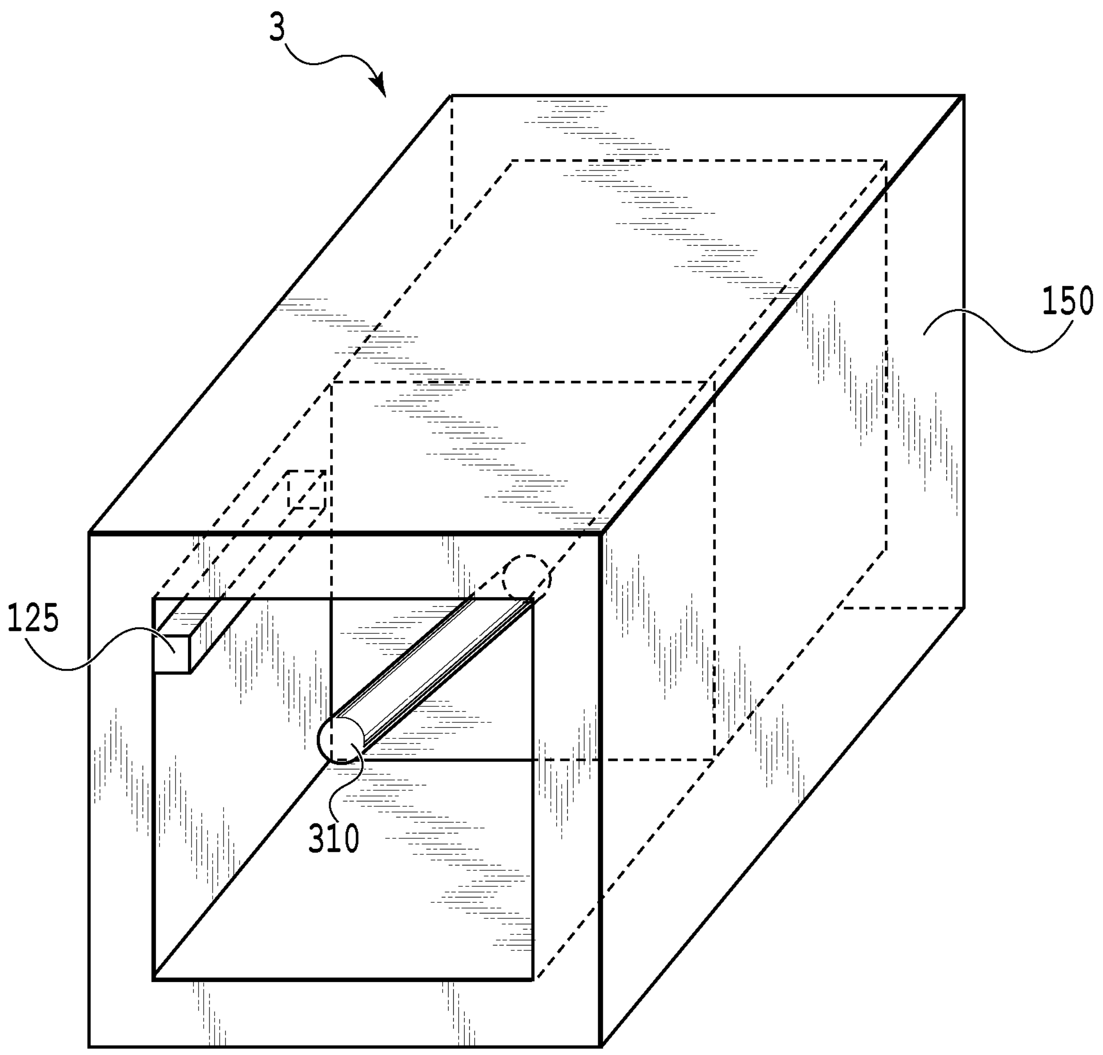
FIG. 5 is a schematic view of a mount portion of a holder.

FIG. 5 is a schematic view of the mount portion 150 of the holder 3. As described above, the printing apparatus 200 has the holder 3. To facilitate the understanding, the following description will be given by illustrating one mount portion 150. The mount portion 150 has the needle 310. As the cartridge 100 is mounted to the printing apparatus 200, the needle 310 is inserted into the supply port 120, and the liquid enters the needle 310. In a case when the printing apparatus 200 performs printing, the liquid inside the cartridge 100 is supplied to the print head 1 through the needle 310 and the inside of the housing of the holder 3. The mount portion 150 has the convex portion 125 on its inner periphery. In the illustrated example, the convex portion 125 is formed at a position corresponding to the first mounting pattern 100A (see FIG. 4A). In a case of mounting the cartridge 100 to the printing apparatus 200, the cover 124 is inserted into the mount portion 150 such that the position of the valve body 121 and the position of the needle 310 coincide with each other and the position of the concave portion 126 and the position of the convex portion 125 coincide with each other. After the cover 124 is properly inserted to an inner part of the mount portion 150, the holder 3 can hold the cartridge 100. In other words, the cartridge 100 reaches a state of being properly mounted to the printing apparatus 200.

<Forming Pattern of Convex Portion 125>

Figure 6D:
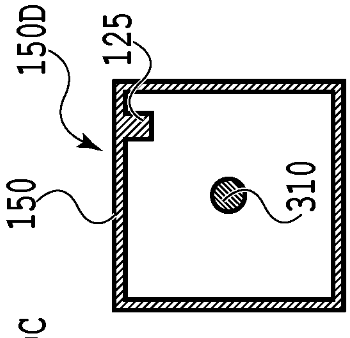
FIGS. 6A to 6D are views illustrating examples of the forming pattern of a convex portion of a mount portion in the first embodiment.
Figure 6C:
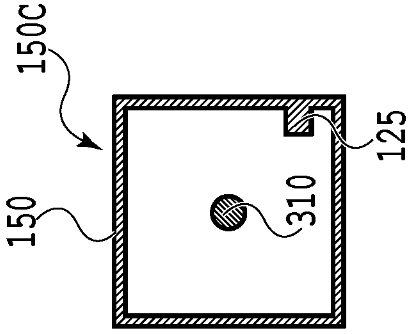
Figure 6B:
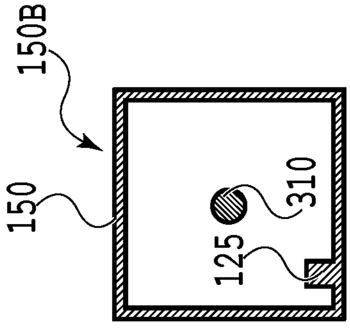
Figure 6A:
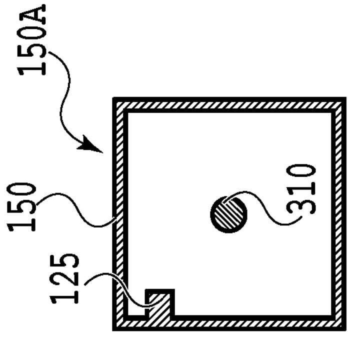

FIGS. 6A to 6D are views illustrating examples of the forming pattern of the convex portion 125 of the mount portion 150 in the present embodiment. FIGS. 6A to 6D illustrate states as viewed from the front of the cartridge 100. FIG. 5 exemplarily illustrates a single mount portion 150, but the holder 3 may have a plurality of mount portions 150. In the present embodiment, the shapes of the mount portions 150 illustrated in FIGS. 6A to 6D are different and correspond to the types of the liquids stored in the storage portions 110 of the cartridges 100 to be mounted to the mount portions 150. FIG. 6A is a view illustrating a first forming pattern 150A of the mount portion 150. The holder 3 mentioned above has a mount portion 150 with a shape corresponding to the shape of the cover 124 of the cartridge 100. In the example illustrated in FIG. 6A, the holder 3 has a mount portion 150 with a shape corresponding to the shape of the cover 124 illustrated in FIG. 4A. FIG. 6B is a view illustrating a second forming pattern 150B of the mount portion 150. The shape of the mount portion 150 illustrated in FIG. 6B corresponds to the shape of the cover 124 illustrated in FIG. 4B. FIG. 6C is a view illustrating a third forming pattern 150C of the mount portion 150. The shape of the mount portion 150 illustrated in FIG. 6C corresponds to the shape of the cover 124 illustrated in FIG. 4C. FIG. 6D is a view illustrating a fourth forming pattern 150D of the mount portion 150. The shape of the mount portion 150 illustrated in FIG. 6D corresponds to the shape of the cover 124 illustrated in FIG. 4D. For example, the cartridges 100 illustrated in FIGS. 4A to 4D are mounted to the mount portions 150 illustrated in FIGS. 6A to 6D, respectively.

<Corresponding Relation between Concave Portion 126 and Convex Portion 125>

In the present embodiment, the concave portion 126 illustrated in FIG. 4A is configured to be fitted to the first convex portion (the convex portion 125 illustrated in FIG. 6A) in a case when the cartridge 100 is mounted in a predetermined orientation to the first mount portion having the first convex portion (the mount portion 150 illustrated in FIG. 6A). In the printing apparatus 200, the second mount portion (the mount portion 150 illustrated in FIG. 6B) other than the first mount portion has the second convex portion (the convex portion 125 illustrated in FIG. 6B) provided at a position different from a position at which the first convex portion of the first mount portion is provided. Incidentally, when it comes to the cover 124 alone, the concave portion 126 can be fitted to the second convex portion of the second mount portion other than the first mount portion if the cover 124 is turned by a predetermined angle (ninety degrees in the clockwise direction) from the predetermined orientation about the supply port 120 as the center of the turn axis. However, the cartridge 100 with the cover 124 mounted thereto is mounted to the second mount portion in the predetermined orientation.

<Case where Cartridge 100 can be Mounted to Printing Apparatus 200>

Figure 7:
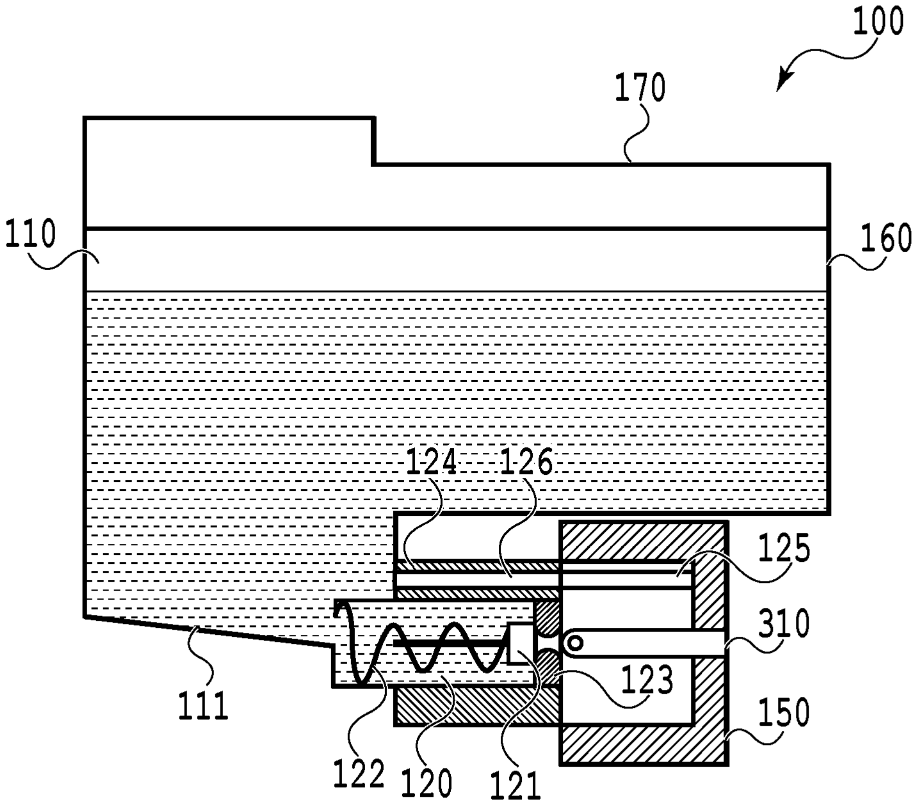
FIG. 7 is a schematic cross-sectional view illustrating a state where the cartridge is not mounted to a printing apparatus.

FIG. 7 is a schematic cross-sectional view illustrating a state where a cartridge 100 is not mounted to the printing apparatus 200. In the following description, components of the cartridge 100 necessary for mounting it to the corresponding mount portion 150 are mainly illustrated using the schematic view. As for the holder 3, the needle 310 and the convex portion 125 are mainly illustrated. Steps for mounting the cartridge 100 to the printing apparatus 200 will be described below in sequence. The following description will be given assuming a case of mounting the cartridge 100 having the first mounting pattern 100A to the mount portion 150 having the first forming pattern 150A.

The cover 124 mounted to the outer periphery of the supply port 120 has the opening 1240 (see FIG. 3), which is larger than the outer periphery of the needle 310, in order to make it easier to mount the cartridge 100. This makes it possible to guide the needle 310 in a case of mounting the cartridge 100 to the printing apparatus 200. As illustrated in FIG. 7, before the needle 310 is inserted, the opening of the supply port 120 is sealed by the valve body 121 and the sealing member 123. Also, in the illustrated example, the position of the concave portion 126 and the position of the convex portion 125 correspond to each other. Thus, the concave portion 126 can be fitted to the convex portion 125. That is, the concave portion 126 can guide relative insertion of the convex portion 125.

Figure 8:
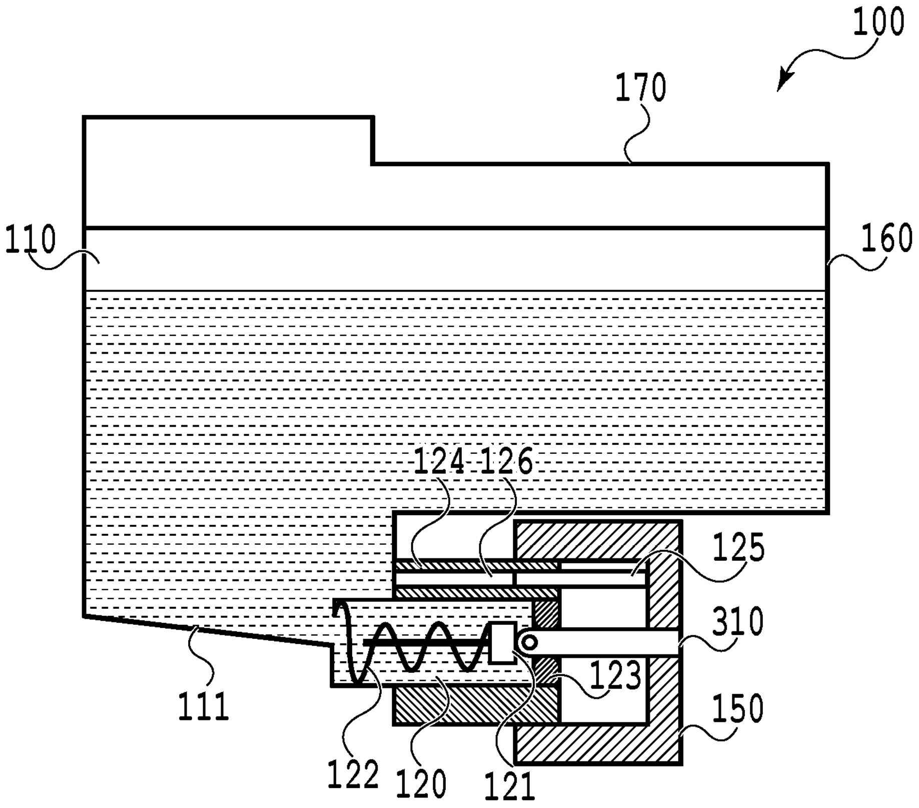
FIG. 8 is a schematic cross-sectional view illustrating a state where the cover is inserted in the mount portion, and a concave portion is fitted to the convex portion.

FIG. 8 is a schematic cross-sectional view illustrating a state where the cover 124 is inserted in the mount portion 150 and the concave portion 126 is fitted to the convex portion 125. As illustrated in FIG. 8, the needle 310 gets inserted into the supply port 120 as the cartridge 100 is moved farther from the position illustrated in FIG. 7 in the insertion direction (from left to right in FIG. 8). In the mounting of the cartridge 100 to the printing apparatus 200, the needle 310 firstly gets inserted by sliding in tight contact with the sealing member 123. The needle 310 inserted in the supply port 120 pushes the valve body 121 against the biasing force from the valve spring 122. Then, being pushed by the needle 310, the valve body 121 moves in a direction away from the sealing member 123. As a result, the supply port 120 is opened. In other words, a state where the liquid can be supplied to the print head 1 is reached.

Between the outer periphery of the cover 124 and the inner periphery of the mount portion 150, on the other hand, the concave portion 126 guides the relative insertion of the convex portion 125. Thus, not only the opening 1240 of the cover 124 guides the relative insertion of the needle 310 but also the concave portion 126 of the cover 124 guides the relative insertion of the convex portion 125. This stabilizes the insertion of the cartridge 100. Pushing the cartridge 100 to a position where the supply port 120 cannot be inserted any farther completes the mounting of the cartridge 100 to the mount portion 150 of the printing apparatus 200.

Thus, in a case where the type of the liquid stored in the cartridge 100 matches the type of the liquid to be supplied to the mount portion 150, the cartridge 100 can be mounted to the mount portion 150. To detach the cartridge 100 from the printing apparatus 200, the reverse of the operations in the above-described mounting process is performed.

<Case When Cover 124 and Mount Portion 150 Function as Mismounting Inhibition Mechanism>

A case when the concave portion 126 of the cover 124 and the convex portion 125 of the mount portion 150 function as a mismounting inhibition mechanism will be described below. Specifically, a case when the mounting pattern of the cover 124 and the forming pattern of the convex portion 125 do not correspond to each other and the cartridge 100 cannot therefore be mounted to the printing apparatus 200 will be described. The following description will be given assuming a case of inhibiting mounting of the cartridge 100 having the second mounting pattern 100B to the mount portion 150 having the first forming pattern 150A.

Figure 9:
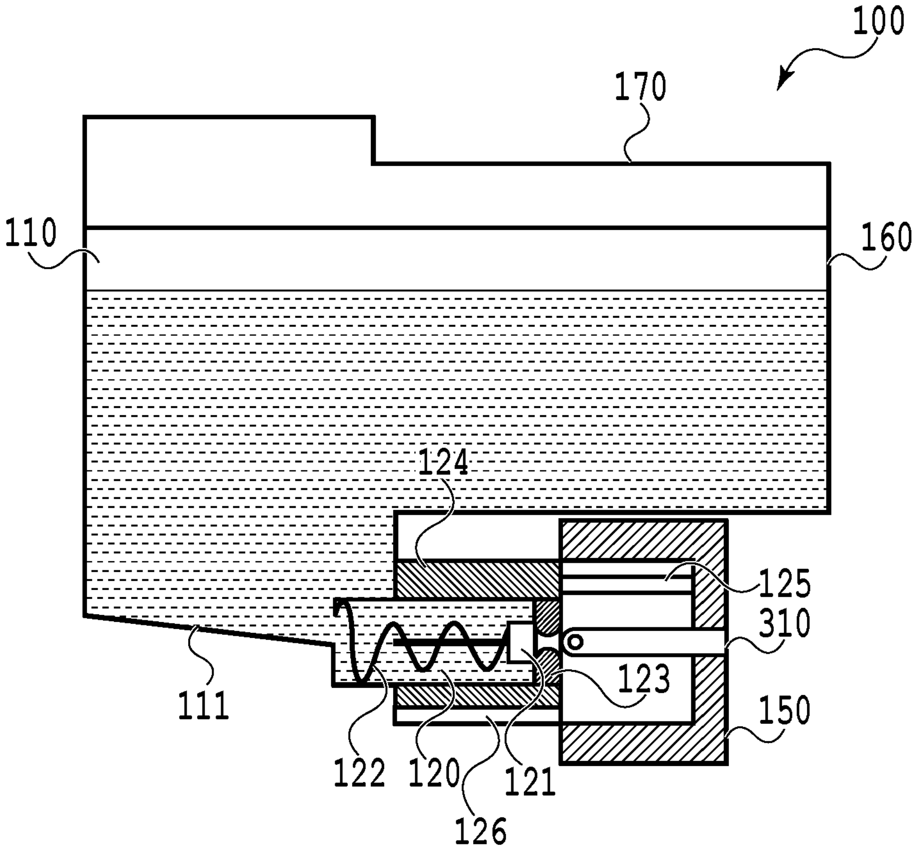
FIG. 9 is a schematic cross-sectional view illustrating a state where the cover and the mount portion function as a mismounting inhibition mechanism.

FIG. 9 is a schematic cross-sectional view illustrating a state where the cover 124 and the mount portion 150 function as a mismounting inhibition mechanism. As illustrated in FIG. 9, the concave portion 126 is positioned on a lower side whereas the convex portion 125 is positioned on an upper side of the mount portion 150. For this reason, in a case when one tries to mount the cartridge 100 to the printing apparatus 200 with the position of the concave portion 126 and the position of the convex portion 125 not corresponding to each other, the front face of the cover 124 will contact the front face of the convex portion 125. This inhibits mismounting of the cartridge 100 to the mount portion 150 not corresponding to it.

CONCLUSION

As described above, the cover 124 is turned by a predetermined angle and then mounted to the supply port 120. In this way, a plurality of mounting patterns can be created by using a single type of cover 124. Thus, the number of parts necessary for inhibiting mismounting of a cartridge 100 is reduced. Specifically, the manufacturing cost of a cartridge 100 having a mismounting inhibition mechanism is reduced. In the printing apparatus 200, on the other hand, the mount portion 150 has the convex portion 125. Thus, a cartridge 100 with a concave portion 126 whose position does not correspond to the position of the convex portion 125 is inhibited from being mounted to the printing apparatus 200. Accordingly, the concave portion 126 of the cartridge 100 and the convex portion 125 of the printing apparatus 200 according to the present embodiment function as a mechanism that inhibits mismounting of the cartridge 100.

Hence, the mismounting inhibition mechanism according to the present disclosure can inhibit mismounting of the cartridge 100 with a simple configuration. Also, in the present embodiment, the supply port 120 is disposed inside the opening 1240 of the cover 124. Thus, using the mismounting inhibition mechanism inhibits attachment of a type of liquid different from the liquid stored in the storage portion 110 to the supply port 120.

Modification 1 of First Embodiment

Modification 1 is aimed at providing mismounting inhibition mechanisms with more patterns.

Figure 10A:
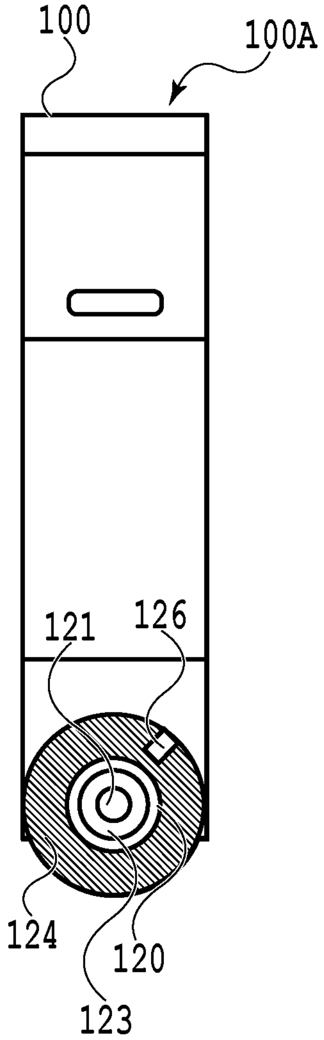
FIGS. 10A to 10C are views illustrating modifications in which the concave portion is formed in the outer periphery of the cover.
Figure 10B:
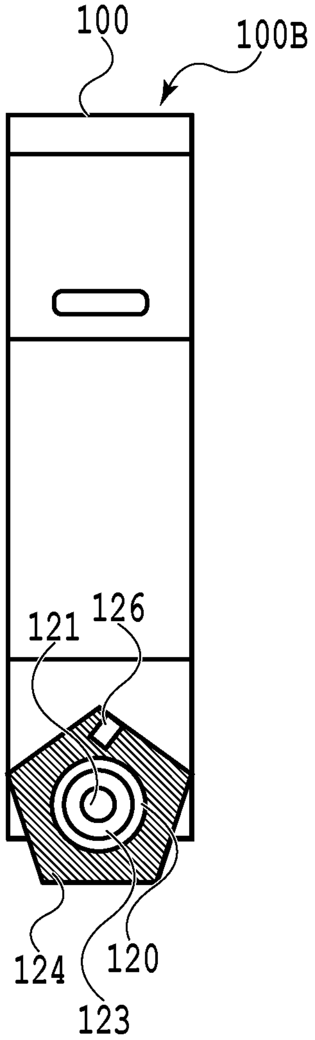
Figure 10C:
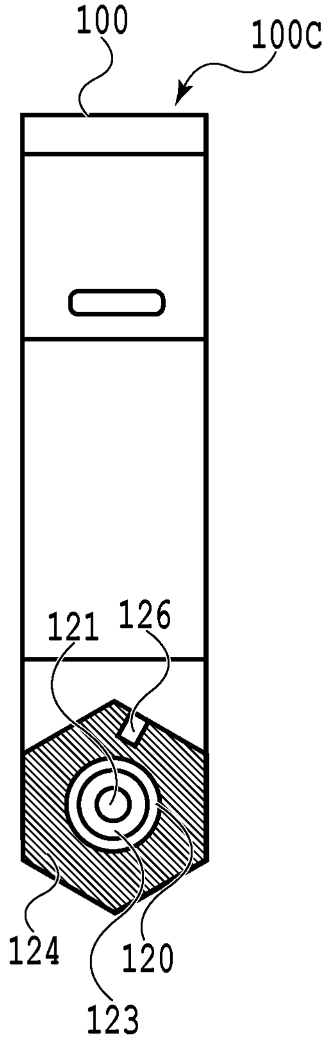

FIGS. 10A to 10C are views illustrating modifications in which the concave portion 126 is formed in the outer periphery of the cover 124. As illustrated in FIG. 10A, the shape of a cross section of the cover 124 cut in a direction crossing the direction in which the cover 124 is inserted into the mount portion 150 includes a substantially annular shape. In the illustrated example, the shape of the cross section of the cover 124 includes an annular shape. FIG. 10A is a view illustrating an example of a cover 124 having a substantially annular outer periphery. Note that, in the case when the outer periphery of the cover 124 has a substantially annular shape, the outer peripheries of the covers 124 of the other cartridges 100 also have the substantially annular shape. This configuration can provide more mounting patterns than the later-described example illustrated in FIG. 10C by adjusting the mounting angle of the cover 124. As illustrated in FIGS. 10B and 10C, the shape of the cross section of the cover 124 cut in the direction crossing the direction in which the cover 124 is inserted into the mount portion 150 includes substantially regular polygons. The shape of the cross section of the cover 124 illustrated in FIG. 10B includes a substantially regular pentagon. The shape of the cross section of the cover 124 illustrated in FIG. 10C includes a substantially regular hexagon. FIG. 10B is a view illustrating an example of a cover 124 having a substantially regular pentagonal outer periphery. This configuration can provide five mounting patterns by adjusting the mounting angle of the cover 124 at intervals of 72 degrees. Thus, even in a case when there are five types of cartridges 100 to be mounted to the printing apparatus 200, each of them can be provided with a mismounting inhibition mechanism. Note that, in the case when the outer periphery of the cover 124 of one cartridge 100 has a substantially regular pentagonal shape, the outer peripheries of the covers 124 of the other four cartridges 100 also have the substantially regular pentagonal shape. Moreover, with the above configuration, the height of each cartridge 100 is the smallest, as illustrated in FIG. 10B. Accordingly, the size of the cartridge 100 is smaller than that in the first embodiment. FIG. 10C is a view illustrating an example of a cover 124 having a substantially regular hexagonal outer periphery. This configuration can provide six mounting patterns by adjusting the mounting angle of the cover 124 at intervals of sixty degrees. Thus, even in a case when there are six types of cartridges 100 to be mounted to the printing apparatus 200, each of them can be provided with a mismounting inhibition mechanism. Note that, in the case when the outer periphery of the cover 124 of one cartridge 100 has a substantially regular hexagonal shape, the outer peripheries of the covers 124 of the other five cartridges 100 also have the substantially regular hexagonal shape.

Also, the shape of the inner periphery of the mount portion 150 of the printing apparatus 200 is changed as appropriate according to the shape of the outer periphery of the cover 124 of each cartridge 100. This configuration can provide mismounting inhibition mechanisms with more patterns.

Modification 2 of First Embodiment

In the examples illustrated in FIGS. 4A to 4D, the concave portion 126 is formed in the outer periphery of the cover 124. In another example of the position to form the concave portion 126, the concave portion 126 may be formed in the inner periphery of the cover 124. Modification 2 is aimed at providing mismounting inhibition mechanisms with more patterns.

Figure 11:
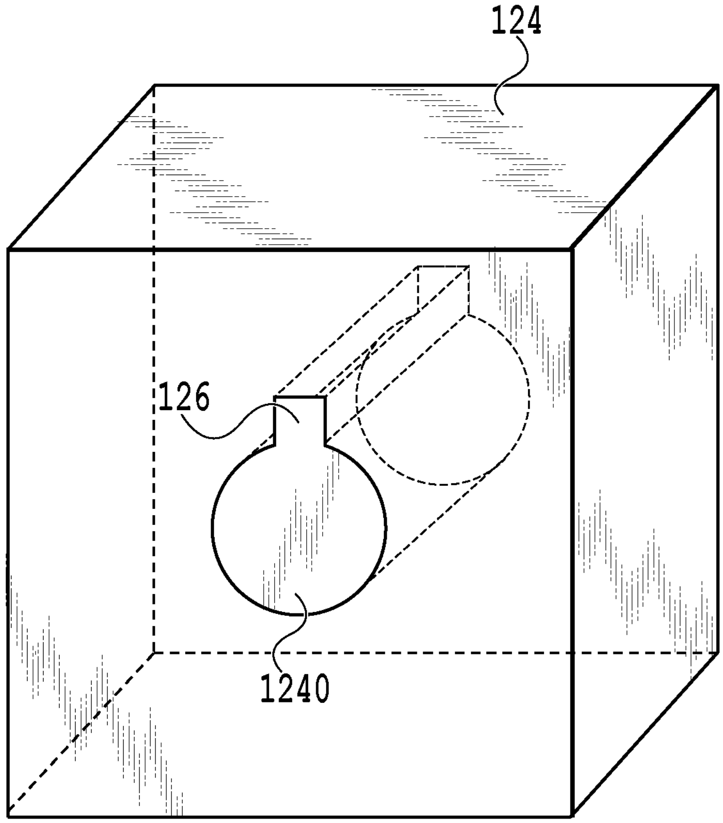
FIG. 11 is a schematic view of a cover according to Modification 2.
Figures 12A, 12B, 12C, 12D:
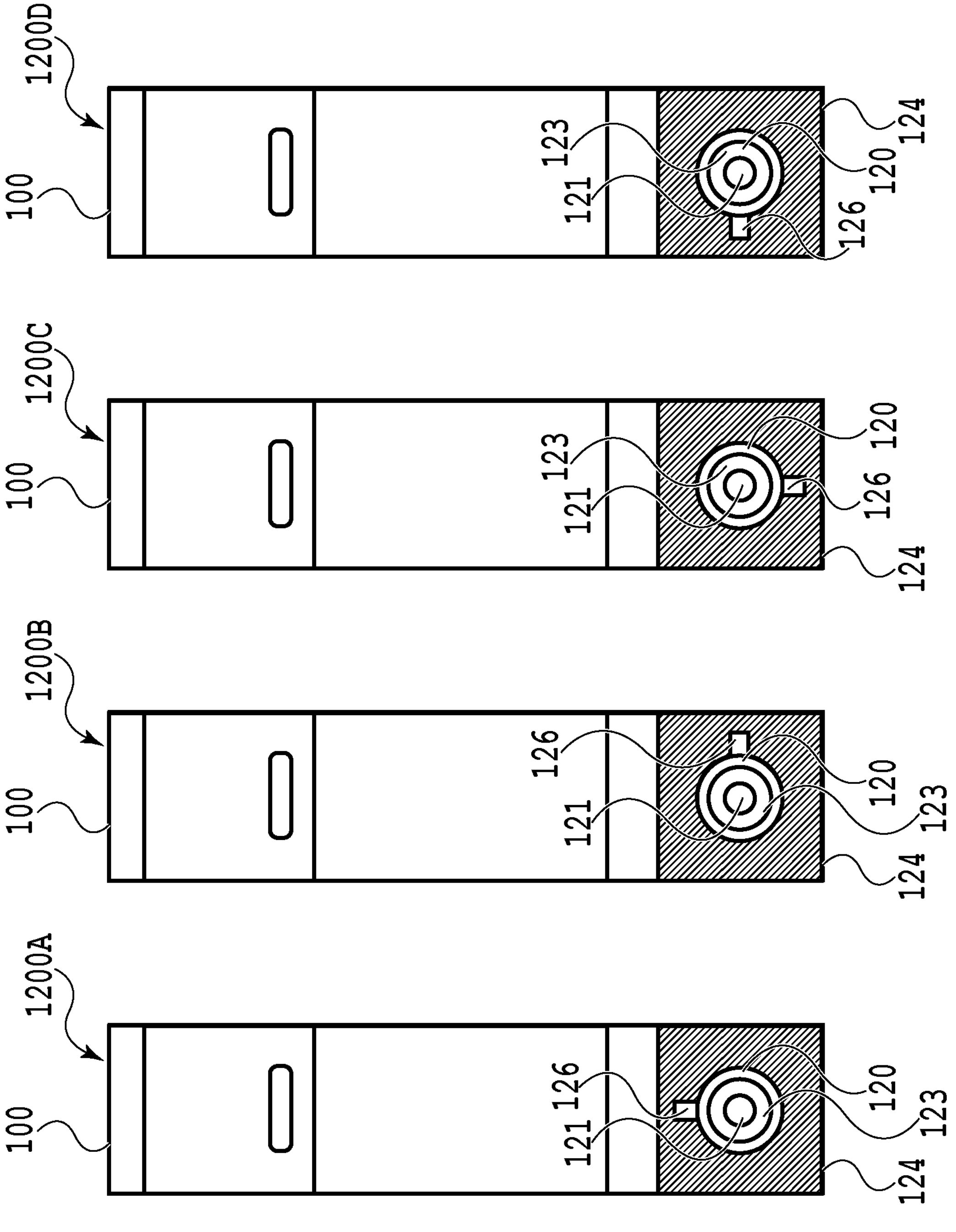
FIGS. 12A to 12D are views illustrating examples of the mounting pattern of the cover in Modification 2.

FIG. 11 is a schematic view of the cover 124 according to the present modification. As illustrated in FIG. 11, the cover 124 according to the present modification has a concave portion 126 recessed from the inner periphery of the opening 1240 toward the outer periphery.

FIGS. 12A to 12D are views illustrating examples of the mounting pattern of the cover 124 in the present modification. As illustrated in FIGS. 12A to 12D, in the present modification, a fifth mounting pattern 1200A, a sixth mounting pattern 1200B, a seventh mounting pattern 1200C, and an eighth mounting pattern 1200D can be provided. In the present modification too, four patterns of mismounting inhibition mechanisms can be created by adjusting the angle at which to mount the cover 124 to the supply port 120 at intervals of 90 degrees about the supply port 120 as the center of the turn axis.

Figure 13:
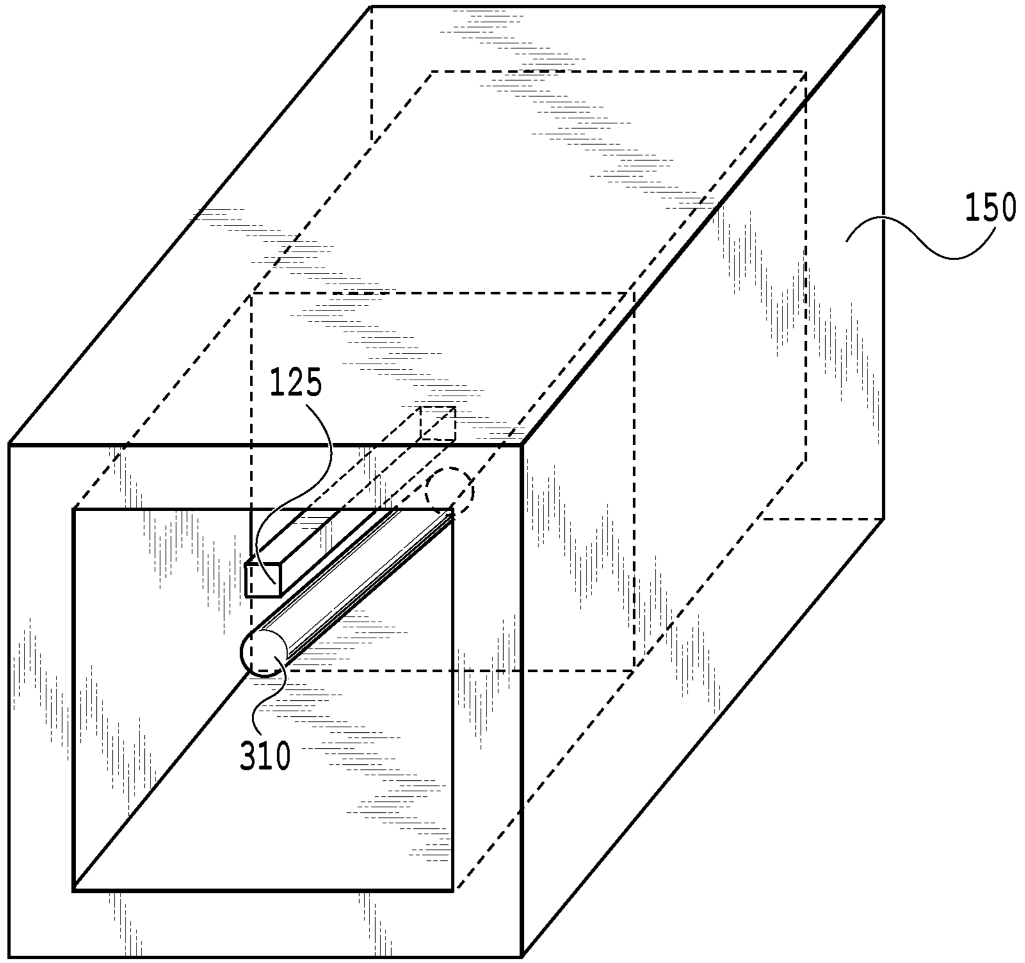
FIG. 13 is a schematic view of a mount portion in Modification 2.

FIG. 13 is a schematic view of the mount portion 150 in the present modification. The mount portion 150 in the present modification has a convex portion 125 extending on the inner side of the mount portion 150 from its back face in the direction opposite to the direction of insertion of the cover 124. In the illustrated example, the convex portion 125 is formed at a position corresponding to the fifth mounting pattern 1200A (see FIG. 12A).

Figures 14A, 14B, 14C:
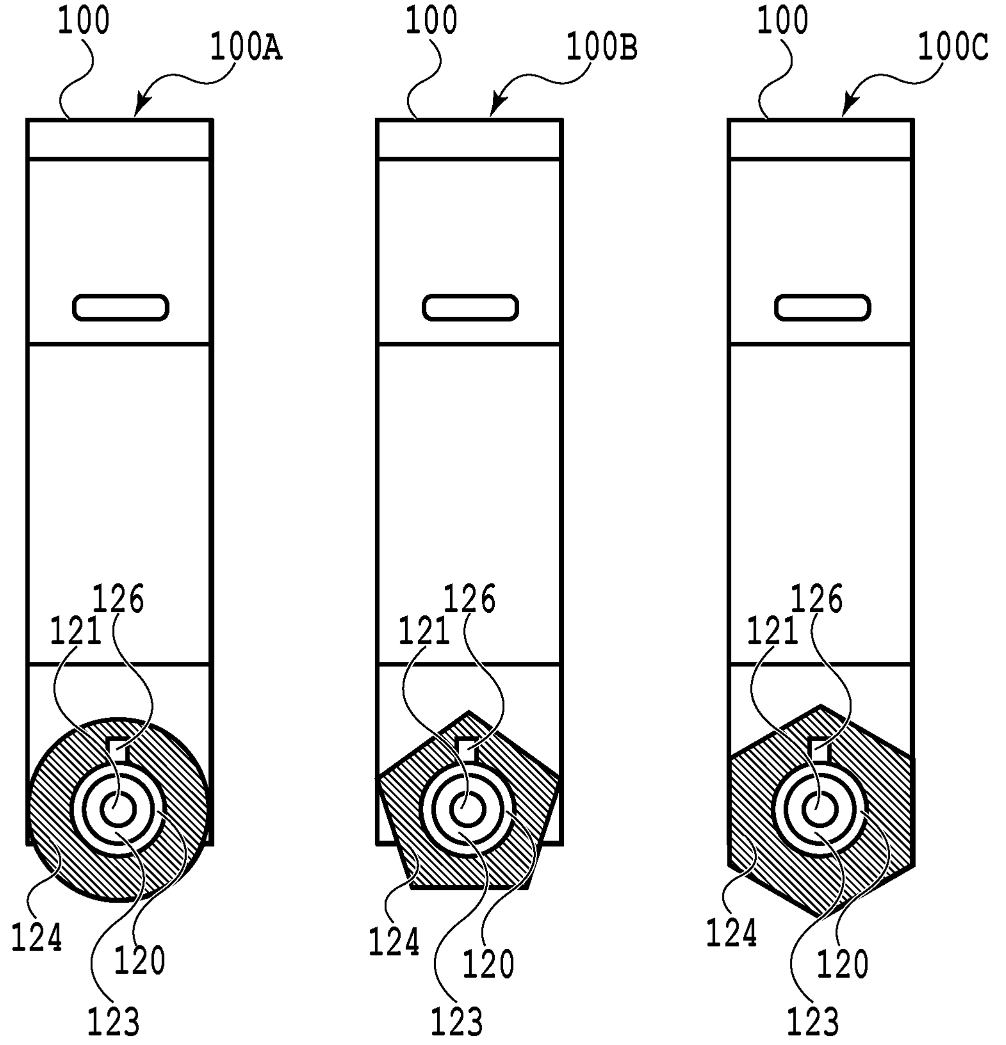
FIGS. 14A to 14C are views illustrating modifications in which the concave portion is formed in the inner periphery of the cover.

FIGS. 14A to 14C are views illustrating modifications in which the concave portion 126 is formed in the inner periphery of the cover 124. The present modification is aimed at providing mismounting inhibition mechanisms with more patterns. Note that descriptions that would be the same as or similar to the examples shown in FIGS. 10A to 10C will be omitted as appropriate. FIG. 14A is a view illustrating an example of a cover 124 having a substantially annular outer periphery. FIG. 14B is a view illustrating an example of a cover 124 having a substantially pentagonal outer periphery. FIG. 10C is a view illustrating an example of a cover 124 having a substantially hexagonal outer periphery. These configurations can provide mismounting inhibition mechanisms with more patterns in a case when the concave portion 126 is formed in the inner periphery of the cover 124.

Second Embodiment

The first embodiment and a second embodiment share the feature of having the concave portion 126 and the convex portion 125 as a mismounting inhibition mechanism. The second embodiment, however, differs from the first embodiment in that the cover 124 has the convex portion 125 and the mount portion 150 has the concave portion 126. For components similar to those in the first embodiment, the same reference signs will be used and a description of those components will be omitted. Differences from the first embodiment will be mainly described.

<Configuration of Mismounting Inhibition Mechanism>

Figure 15A:
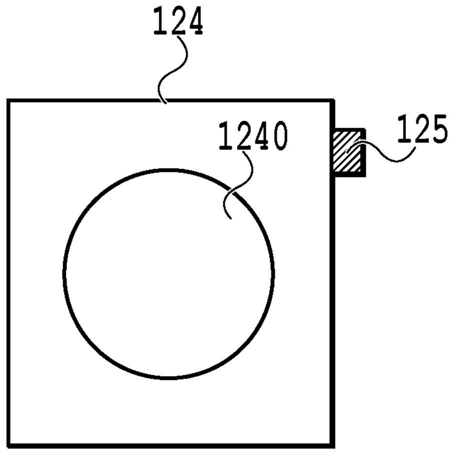
FIGS. 15A and 15B are schematic front views of a cover and a mount portion according to a second embodiment.
Figure 15B:
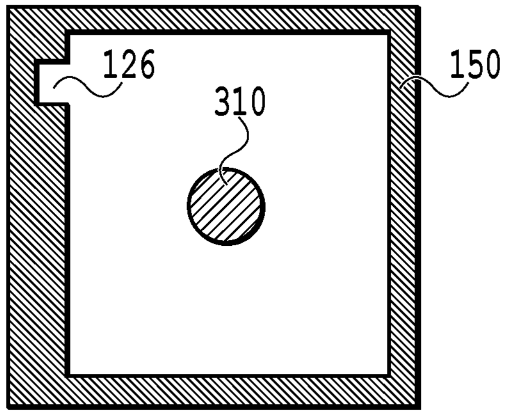

FIGS. 15A and 15B are schematic front views of the cover 124 and the mount portion 150 according to the second embodiment. FIG. 15A is a schematic front view of the cover 124 according to the present embodiment. The cover 124 according to the present embodiment has a convex portion 125 extending along the direction in which the cover 124 is inserted into the mount portion 150 at a position corresponding to the position of the concave portion 126 (see FIG. 15B) of the mount portion 150. FIG. 15B is a schematic front view of the mount portion 150 according to the present embodiment. As illustrated in FIG. 15A, the cover 124 according to the present embodiment has the convex portion 125. Specifically, the convex portion 125 extends outward from the outer periphery of the cover 124. As illustrated in FIG. 15B, the mount portion 150 according to the present embodiment has the concave portion 126 at a position corresponding to the position of the convex portion 125.

In the present embodiment, the cover 124 has the convex portion 125 (see FIG. 15A) to be fitted to a first concave portion formed in a first mount portion of the printing apparatus 200 to which to mount the cartridge 100. Moreover, the shape of a cross section of the cover 124 includes such shapes that the cross section is symmetric in a case where the cover 124 is turned by a predetermined angle about the supply port 120 as the center of the turn axis. Furthermore, in a case when the cover 124 is turned from a predetermined position to a predetermined angle, the convex portion 125 also moves to a position turned by a predetermined angle and can be mounted to a second mount portion in which a second concave portion is formed at a position different from the first concave portion in the first mount portion. Thus, in a case of mounting a cartridge 100 to a corresponding mount portion 150, the convex portion 125 is fitted to the concave portion 126. Accordingly, the cover 124 can be inserted into the mount portion 150.

On the other hand, in a case when the position of the convex portion 125 of the cover 124 does not correspond to the position of the concave portion 126 of the mount portion 150, the front face of the convex portion 125 will contact the front face of the concave portion 126 if one tries to mount the cartridge 100 to the printing apparatus 200. Accordingly, the cover 124 cannot be inserted into the mount portion 150. That is, in the present embodiment, four patterns of mismounting inhibition mechanisms can be created by adjusting the mounting angle of the cover 124 at intervals of ninety degrees about the supply port 120 as the turn axis at the time of manufacturing cartridges 100. In sum, in the present embodiment too, mismounting of the cartridges 100 can be inhibited with a simple configuration.

Modification of Second Embodiment

In the example illustrated in FIG. 15A, the convex portion 125 is formed on the outer periphery of the cover 124. The convex portion 125 may be formed on the inner periphery of the opening 1240 of the cover 124.

Figure 16:
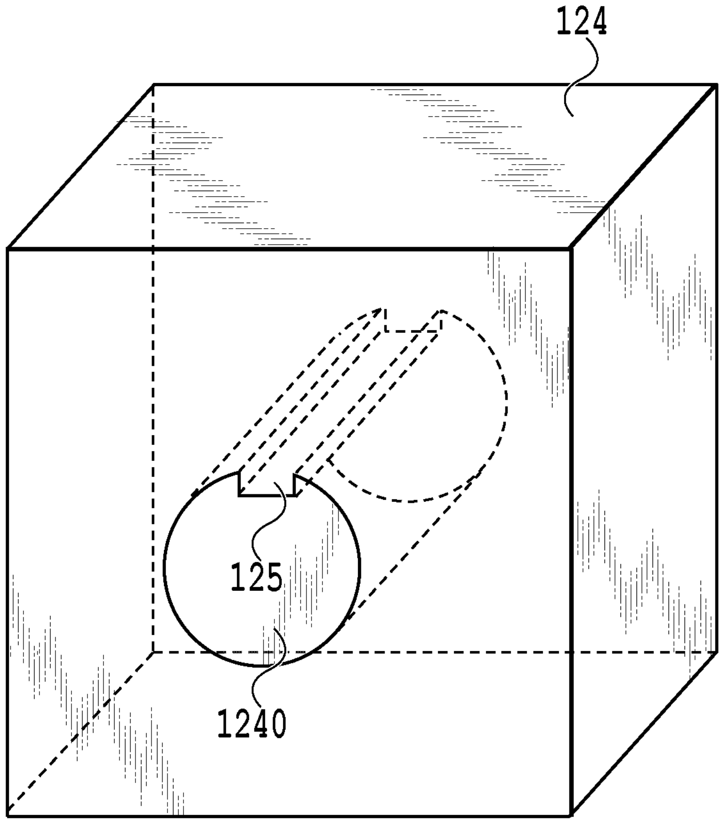
FIG. 16 is a schematic view of a cover according to Modification 3.

FIG. 16 is a schematic view of the cover 124 according to the present modification. As illustrated in FIG. 16, the cover 124 according to the present modification has a convex portion 125 extending inward from the inner periphery of the opening 1240. With this configuration, the cover 124 can be made smaller than in the case when a convex portion 125 is formed on the outer periphery of the cover 124. Note that the cover 124 according to the present modification has a convex portion 125 formed over its entire length in the direction of insertion of the cartridge 100 (length direction). However, the convex portion 125 does not necessarily have to be formed over the entire length in the direction of insertion of the cartridge 100 as long as the convex portion 125 can inhibit mismounting of the cartridge 100. Reducing the region to form the convex portion 125 will further lower the manufacturing cost of the cover 124. For example, the convex portion 125 may be formed only around the front end of the opening 1240.

Figure 17:
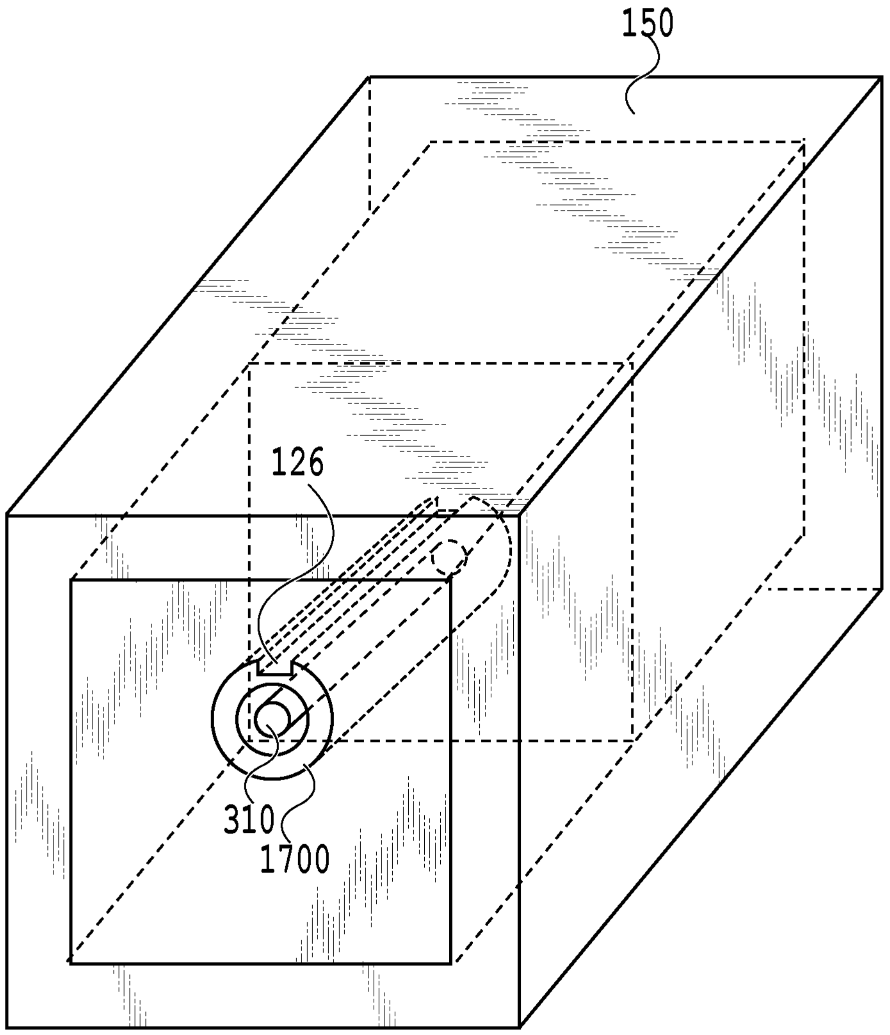
FIG. 17 is a schematic view of a mount portion according to Modification 3.

FIG. 17 is a schematic view of the mount portion 150 in the present modification. In the present modification, the mount portion 150 has a cylindrical portion 1700 surrounding the periphery of the needle 310. The cylindrical portion 1700 has a concave portion 126 recessed inward from its outer periphery. In the present modification, the cover 124 (see FIG. 16) can be inserted into the mount portion 150 in a case when the position of the concave portion 126 in the cylindrical portion 1700 corresponds to the position of the convex portion 125 formed on the inner periphery of the opening 1240. Note that the position of the illustrated concave portion 126 corresponds to the position of the convex portion 125 illustrated in FIG. 16. This means that the front face of the convex portion 125 will contact the front face of the cylindrical portion 1700 in a case when the position of the concave portion 126 in the cylindrical portion 1700 does not correspond to the position of the convex portion 125 formed on the inner periphery of the opening 1240. This inhibits mismounting of the cartridge 100. With this configuration too, mismounting of the cartridge 100 can be inhibited with a simple configuration.

Other Embodiment

In the first and second embodiments, there are a single concave portion 126 and a single convex portion 125. Alternatively, a plurality of concave portions 126 and convex portions 125 may be formed. Forming a plurality of concave portions 126 and convex portions 125 makes it possible to provide more mounting patterns. Also, the shapes of the concave portion 126 and the convex portion 125 are not limited to the shapes exemplarily described in the first embodiment as long as the shapes correspond to each other.

The first embodiment has been described assuming that each cartridge 100 is of an off-carriage type. However, the type of the cartridge 100 may be a so-called on-carriage type.

In the first embodiment, each cartridge 100 has a different mounting pattern of the cover 124 for the corresponding ink color. Alternatively, a plurality of types of apparatuses to which to mount the respective cartridges may each have a different mounting pattern of the cover 124 and a different forming pattern of the concave portion 126. In this case, for example, a printing apparatus of a type different from the printing apparatus 200 illustrated in FIG. 1 (i.e., a second printing apparatus) has a convex portion 125 and a mount portion 150 corresponding to the mounting pattern of the cover 124 and the forming pattern of the concave portion 126 in this example.

The contents of the present disclosure relate to a technology for inhibiting mismounting of a cartridge 100 to the printing apparatus 200. Thus, the technology according to the present disclosure is applicable to configurations in which the supply port 120 is mounted to the mount portion 150.

The cartridge according to the present disclosure can inhibit mismounting of the cartridge with a simple configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge capable of being mounted to a first mount portion of a printing apparatus in a predetermined orientation, the cartridge comprising:

a supply port configured to supply a liquid inside the cartridge to the printing apparatus; and a cover configured to cover an outer periphery of the supply port and having a concave portion at a position along an outer periphery of the cover, wherein the concave portion is configured to be fitted to a first convex portion of the first mount portion in a case when the cartridge is mounted to the first mount portion in the predetermined orientation, and capable of being fitted to a second convex portion of a second mount portion other than the first mount portion in a when the cover is turned by a predetermined angle from the predetermined orientation about the supply port as a center of turn axis, the second convex portion being provided at a position different from a position at which the first convex portion of the first mount portion is provided, wherein the cartridge is not mounted to the second mount portion in the predetermined orientation, and wherein a shape of a cross section of the cover cut in a direction crossing a direction in which the cover is inserted into the first mount portion is a regular quadrilateral except for the concave portion, which is a notch that protrudes inward from an edge of the cross section, such that the cross section is the same except for positioning of the concave portion in a case when the cover is turned by the predetermined angle about the supply port as a turn axis.

2. The cartridge according to claim 1, wherein the concave portion extends along a direction in which the cover is inserted into the first mount portion at a position corresponding to a position of the first convex portion.

3. The cartridge according to claim 1, further comprising an inclined surface at a bottom portion of a storage portion storing the liquid, the inclined surface extending downward toward the supply port.

4. A cartridge capable of being mounted to a first mount portion of a printing apparatus in a predetermined orientation, the cartridge comprising:

a supply port configured to supply a liquid inside the cartridge to the printing apparatus; and a cover configured to cover an outer periphery of the supply port and having a concave portion, wherein the concave portion is (1) configured to be fitted to a first convex portion of the first mount portion in a case when the cartridge is mounted to the first mount portion in the predetermined orientation, and (2) capable of being fitted to a second convex portion of a second mount portion other than the first mount portion in a case when the cover is turned by a predetermined angle from the predetermined orientation about the supply port as a center of turn axis, the second convex portion being provided at a position different from a position at which the first convex portion of the first mount portion is provided, wherein the cartridge is not mounted to the second mount portion in the predetermined orientation, wherein a shape of a cross section of the cover cut in a direction crossing a direction in which the cover is inserted into the first mount portion is a regular quadrilateral except for the concave portion such that the cross section is the same except for positioning of the concave portion in a case when the cover is turned by the predetermined angle about the supply port as a turn axis, and wherein at least one of the following conditions is satisfied:

(A) the concave portion is at a position along either an outer periphery of the cross section or an inner periphery of the cross section; and (B) the cartridge further comprises a valve spring disposed within the supply port.

5. The cartridge according to claim 4, wherein condition (A) is satisfied.

6. The cartridge according to claim 5, wherein the concave portion is at a position along the outer periphery of the cross section.

7. The cartridge according to claim 5, wherein the concave portion is at a position along the inner periphery of the cross section.

8. The cartridge according to claim 4, wherein condition (B) is satisfied.

9. The cartridge according to claim 8, further comprising:

a sealing member; and a valve body, which is biased by the valve spring.

10. A system comprising:

a plurality of cartridges, each being a cartridge according to claim 4, wherein the cover of a first cartridge of the plurality of cartridges is the same shape as the cover of a second cartridge of the plurality of cartridges except that the concave portion of the cover of the first cartridge is disposed at a position rotated, around a direction in which the cover is inserted into the printing apparatus, by ninety degrees or a multiple thereof from a position at which the concave portion of the cover of the second cartridge is disposed.

11. A system comprising:

a plurality of cartridges, each being a cartridge according to claim 4, wherein the cover of a first cartridge of the plurality of cartridges is the same shape as the cover of a second cartridge of the plurality of cartridges except that the shape is rotated by ninety degrees or a multiple thereof around a direction in which the cover is inserted into the printing apparatus.

* * * * *